C. H. TURNER.
CAR SEAT.
APPLICATION FILED AUG. 19, 1919.
1,337,295.
Patented Apr. 20, 1920.
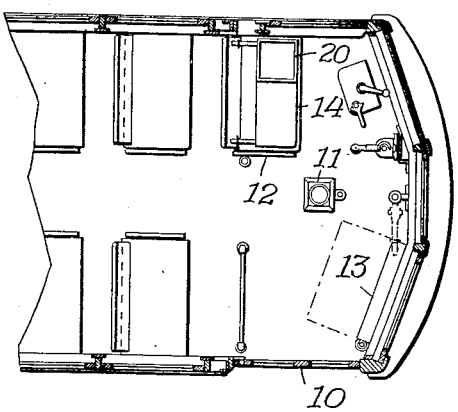
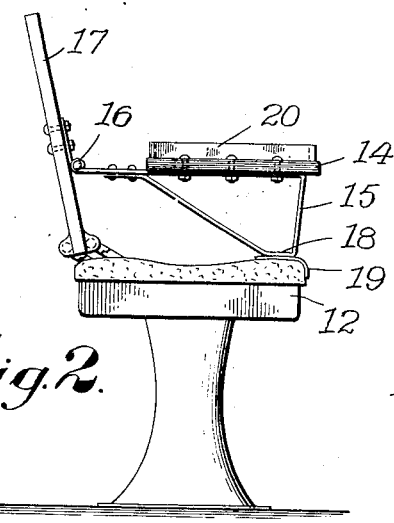
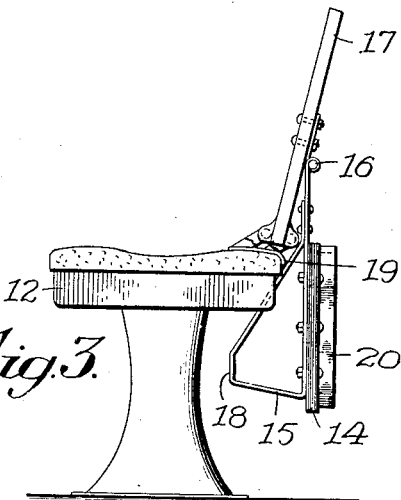
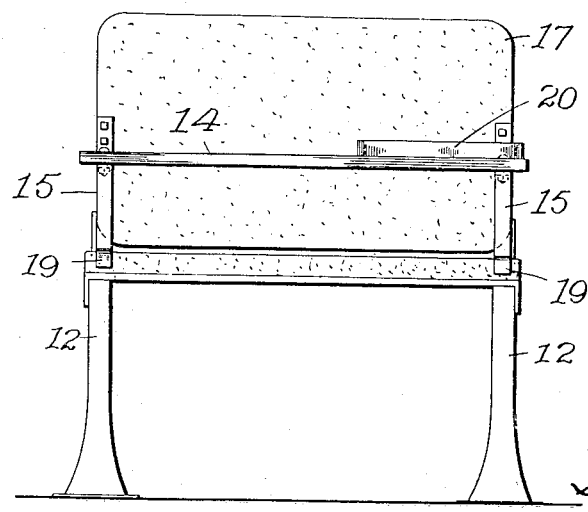
Inventor
Charles H. Turner.
By Attorneys
Southgate & Southgate

UNITED STATES PATENT OFFICE.

CHARLES H. TURNER, OF WORCESTER, MASSACHUSETTS, ASSIGNOR TO OSGOOD BRADLEY CAR COMPANY, A CORPORATION OF MASSACHUSETTS.

CAR-SEAT.

1,337,295.      Specification of Letters Patent.      Patented Apr. 20, 1920.

Application filed August 19, 1919. Serial No. 318,445.

*To all whom it may concern:*

Be it known that I, CHARLES H. TURNER, a citizen of the United States, residing at Worcester, in the county of Worcester and State of Massachusetts, have invented a new and useful Car-Seat, of which the following is a specification.

This invention relates to a car seat and particularly to an auxiliary seat designed for the temporary use of a motorman or car operator.

In certain types of cars, the forward end seat is so near to the motorman that it can not be used for passengers except when the car is running in the reverse direction. It is the object of my present invention to provide a construction permitting this forward end seat to be utilized as a raised seat for the motorman when the car is running in one direction and to also serve as a regular seat for passengers when the car is running in the opposite direction.

With this general object in view, an important feature of my invention relates to the provision of an auxiliary seat mounted on the regular seat and so disposed that the reversal of the seat back will move the auxiliary seat to operative or inoperative position.

Other features of my invention relate to arrangements and combinations of parts which will be hereinafter described and more particularly pointed out in the appended claims.

A preferred form of my invention is shown in the drawings in which—

Figure 1, is a partial plan view of a street car embodying my invention;

Fig. 2 is a side elevation of my improved seat;

Fig. 3 is a similar view with the parts in a different position; and

Fig. 4 is a front elevation of the seat.

Referring to Fig. 1, I have indicated the floor plan of the front end of a car of the type commonly known as "a one-man" car. In this car, the passengers enter and leave the car through a door 10, and deposit their fares in a fare box 11. The motorman's station is behind the fare box at the left hand side of the platform, in which position he is almost directly in front of the forward end seat 12 on the left-hand side, which seat, accordingly, can not be used for passengers. When the direction of travel is reversed, however, the seat should be available for passengers, as is also a folding seat 13, which may then be swung down to the position indicated in dotted lines in Fig. 1.

As the seat 12 can not be used for passengers when it is a forward seat, I provide an auxiliary seat 14 (Figs. 2 and 4) for the use of the motorman. This seat 14 is preferably secured to metal frames 15 at each end thereof, said frames being hinged or pivoted at 16 to the back 17 of the seat 12. The lower front portion 18 of each frame 15 rests upon a wear plate 19 secured to the seat 12.

In Fig. 2, the parts are shown in operative position and in Fig. 3, the seat is shown in the inoperative position which it assumes when the back 17 is reversed. When the parts are moved from the position shown in Fig. 3 to that shown in Fig. 2, the plates 19 act also as cam plates to raise the auxiliary seat 14 to operative position.

One end of the seat 14 may be provided with a raised edge or rail 20 inclosing a storage space in which tickets, transfers or other articles may be placed without danger of displacement.

While I have described the seat as particularly adapted to a one-man car, it will be understood that it is equally well adapted to any car in which the position of the motorman prevents the use of one of the forward end seats by passengers.

Having thus described my invention, it will be evident that changes and modifications can be made therein by those skilled in the art within the spirit and scope of my invention as set forth in the claims, and I do not wish to be otherwise limited to the details herein disclosed, what I claim is:—

1. A car seat having in combination, a seat portion, a reversible back having two back-supporting positions, and an auxiliary seat connected to the back and movable to operative and inoperative positions relative to said seat portion by movement of said back to one or the other of its two back-supporting operative positions.

2. A car seat having, in combination, a seat portion, a reversible back, and an auxiliary seat connected to said back and resting upon said seat portion when in operative position, said auxiliary seat being moved to inoperative position by reversal of the back.

3. A car seat having, in combination, a seat portion, a reversible back, and an auxiliary seat pivoted to said back at a point substantially above said seat portion and also engaging said seat portion for support when said auxiliary seat is in operative position.

4. A car seat having, in combination, a seat portion, a reversible back, and an auxiliary seat pivoted to said back at a point substantially above said seat portion, and having a supporting frame resting upon said seat portion when said auxiliary seat is in operative position.

5. A car seat having, in combination, a seat portion, a reversible back, and an auxiliary seat supported above said seat portion when said back is in one position and depending from said back and behind said seat when said back is in its opposite position.

6. A car seat having in combination, a seat portion, a reversible back, and an auxiliary seat connected to the back and movable to operative and inoperative positions relative to said seat portion by movement of said back to one or the other of its two positions, said auxiliary seat having a part thereof surrounded by a raised edge effective to prevent displacement of articles placed therein.

In testimony whereof I have hereunto affixed my signature.

CHARLES H. TURNER.